Aug. 3, 1965
M. MAYRATH ETAL
3,198,320
CENTER DRIVEN AUGER CONVEYOR
Filed Oct. 5, 1962
3 Sheets-Sheet 1
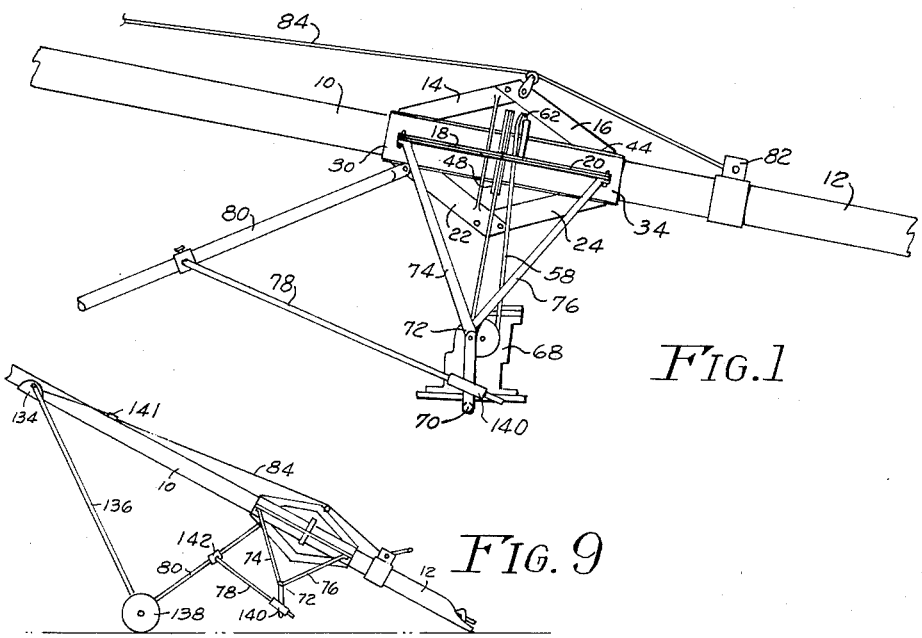
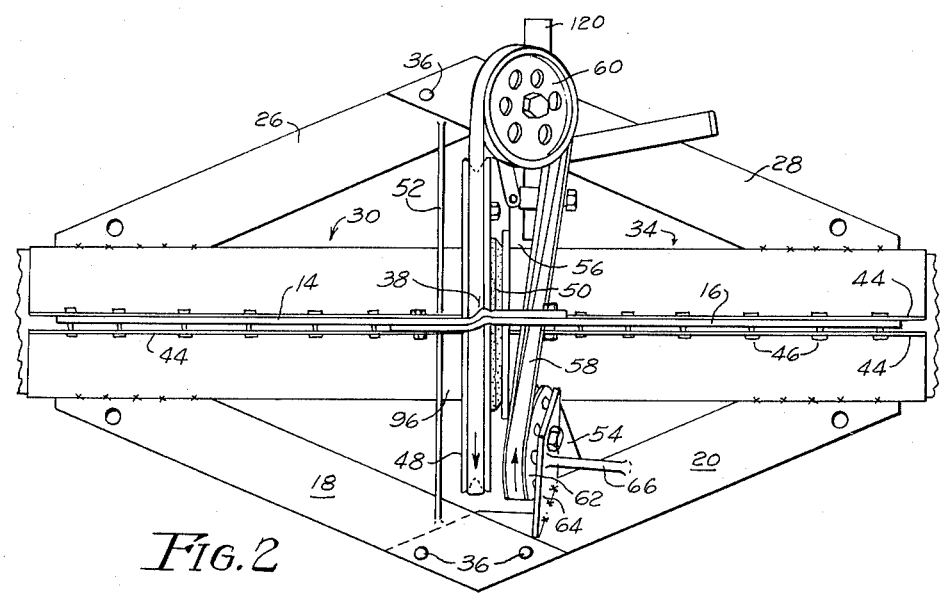

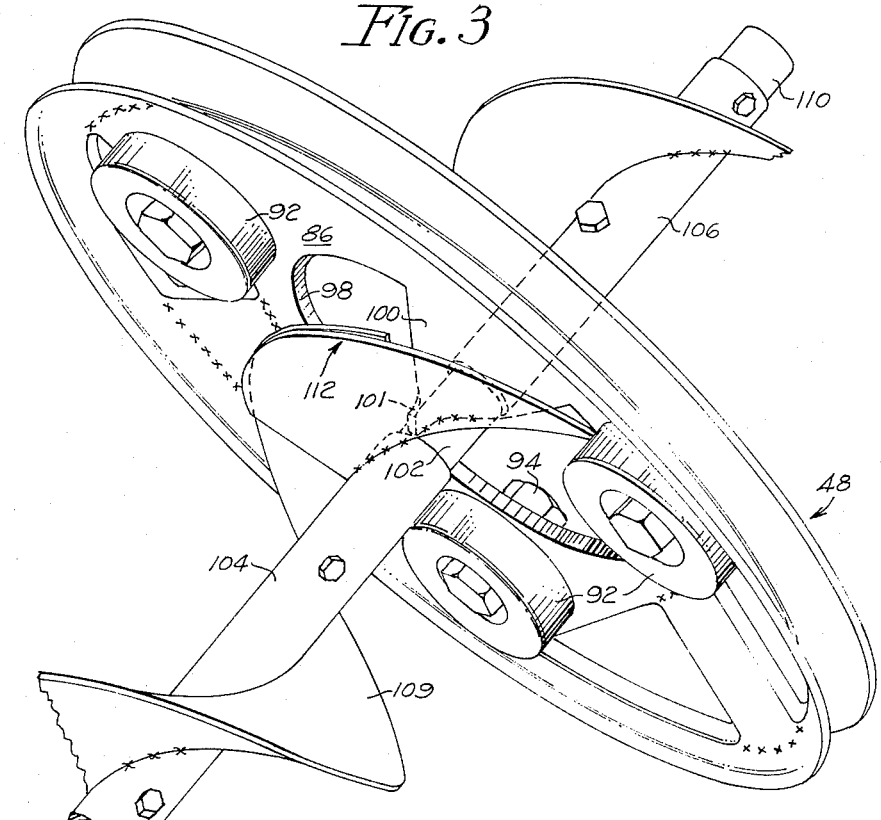
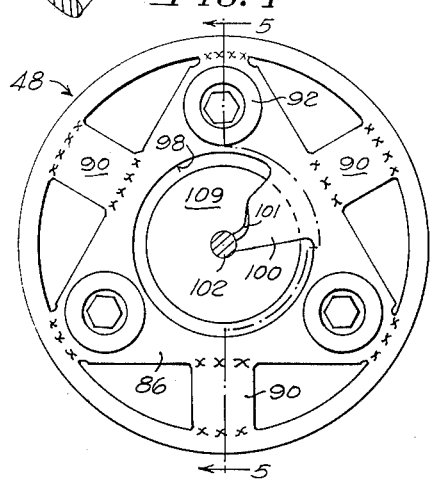
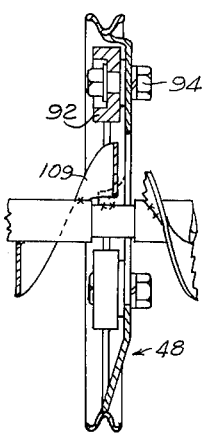

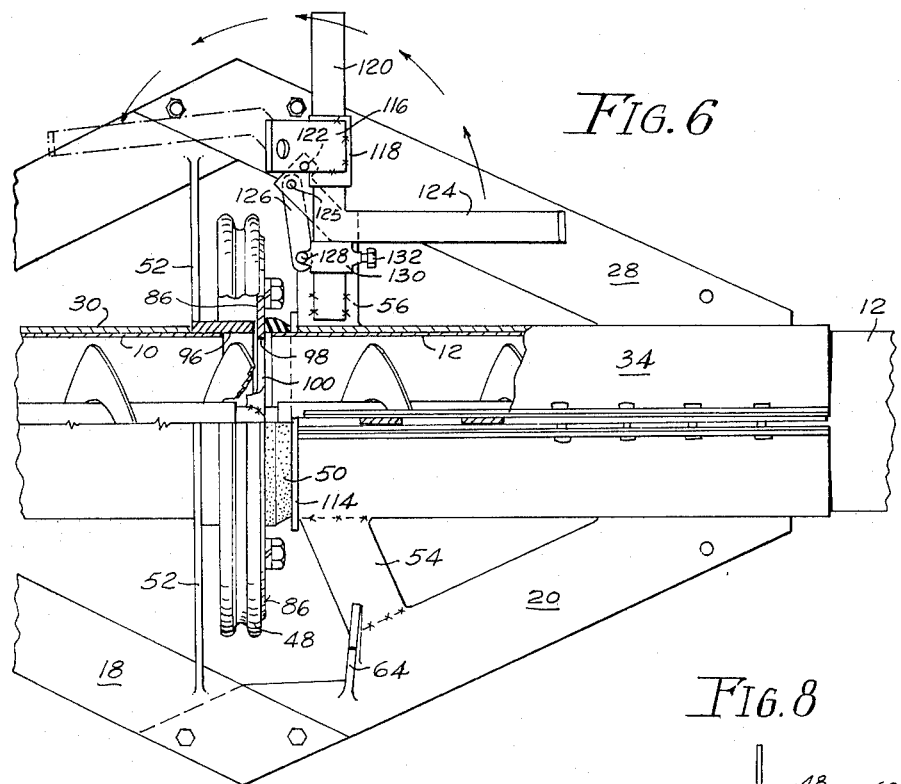
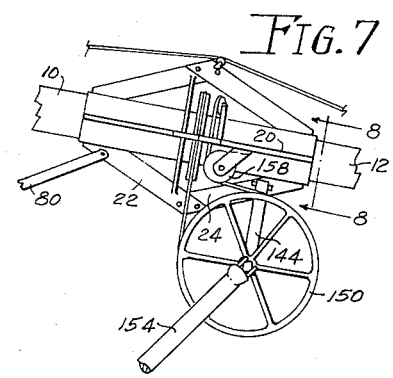
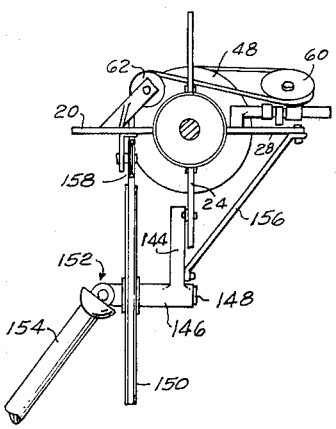

United States Patent Office 3,198,320
Patented Aug. 3, 1965

3,198,320
CENTER DRIVEN AUGER CONVEYOR
Martin Mayrath, Dallas, Tex., and Charlie E. Pike and John W. Kendall, Dodge City, Kans., assignors to Mayrath Machinery Co., Inc., a corporation of Kansas
Filed Oct. 5, 1962, Ser. No. 228,678
7 Claims. (Cl. 198—213)

This invention pertains to auger conveyors, and especially to an encased auger conveyor in which the driving power is applied to the auger flight at an intermediate point, rather than at either of the free ends of the flight.

The invention is especially applicable to portable or wheeled auger conveyors of considerable length, in which the driving engine or motor is desirably positioned at an intermediate position for reasons of mechanical stability and strength. Transmission of power from the engine to either extremity of the auger flight involves long belts or complex and inefficient transfer pulleys, gear boxes or the like.

It has been recognized by prior inventors that a "center" drive operating on the auger flight at an intermediate point would greatly simplify the power transmission problem; however, the necessity for interrupting the continuity of the auger tube at or near the driving point has produced other problems not satisfactorily solved by these previous proposals. In addition, many prior designs have involved complex internal bearings, elaborate sealing facilities, expensive gear combinations, or have so weakened the structure that reliability and long life were sacrificed; and often the free aperture for passage of the material has been severely restricted.

It may be mentioned at this point that the application of an intermediate drive to a portable conveyor such as a grain loader for farm use is in many ways distinct from the application to a fixed installation. In a factory or power plant, for example, the auger often need not be totally enclosed, and even if it is, the tubular casing can usually be supported at as many intermediate points as prove to be necessary. Also, in such installations, considerations of total weight, balance and even minimum costs are usually secondary.

It is accordingly a principal object of the present invention to provide an encased tubular auger conveyor driven at an intermediate point, which employs a simple and efficient single-belt drive from the prime mover, without restricting the flow path of the conveyed material, and without weakening the tubular structure or impairing its resistance to leakage of grain or other commodities.

A secondary object of the invention is to provide a conveyor having the above features, which can be constructed at low cost as a simple but extremely strong welded assembly of flat plates and shapes, rather than the elaborate and heavy castings, bull gears and similar objectionable components of most previous designs.

Further objects are to provide a machine of this type in which replacement of the simple driving belt, when required, does not necessitate disassembly of the conveyor or any of its parts; in which the center-drive mechanism also includes simple and convenient arrangements for mounting the engine or motor in level orientation; in which a convenient power-clutch is incorporated in a very direct and effective manner; and in which direct driving connection to a separately mounted prime mover can easily be provided.

Briefly, the above and other advantages of the invention are accomplished by a construction in which the auger tube is formed by two distinct and separate lengthwise sections having confronting ends held in closely spaced relation by a welded and bolted assembly of external connecting ribs which also serves as a support for a belt clutch and a suspended engine mount. A main drive pulley is journalled about these confronting ends, as upon an external surface of a tube end or of a sleeve encompassing that end, and this drive pulley has its central web apertured to conform substantially to the clear internal aperture of the tube sections, except for a single "spoke" which projects radially inward and is welded to the auger flight or ((preferably)) to its central shaft. This "spoke," in a preferred construction, is shaped to conform to the helical auger flight surfaces, and is disposed just behind the flight on the opposite side from its wearing surface, so as not to impede the flow of material to any appreciable degree. The arragement described permits a "spoke" of adequate strength to be provided, even though it may be of no greater thickness (say ¼ inch) than the pulley web plate, because it may have a substantial angular width (say 45 degrees) without impeding the grain flow to an objectionable extent. Also, the very slight axial thickness of the pulley web simplifies the problems resulting from the piling up of grain at the periphery of this section due to centrifugal force; an effect which introduces serious drag or flow resistance in prior designs which utilize a rotating intermediate tube-section of considerable length.

The invention will best be understood from the following detailed specification of a preferred embodiment thereof, given by way of example but not necessarily of limitation, and taken in connection with the accompanying drawings, in which:

FIG. 1 is a side elevation of the construction applied to a wheeled or portable conveyor, parts not directly related to the invention being omitted; the left side of this figure is toward the outlet end of the auger.

FIG. 2 is an enlarged plan view of the central portion of FIG. 1.

FIG. 3 is a perspective view of the assembly of main drive pulley and the center auger shaft section, showing the connecting sleeves for attachment of the remaining auger shafting for the conveyor. The lower left corner is toward the outlet end of the auger.

FIG. 4 is a face view of the same main drive pulley, looking at the face that is exposed in FIG. 3, which is the side toward the outlet end of the auger.

FIG. 5 is a composite transverse sectional view of the pulley, taken along line 5—5 of FIG. 4, the left side of this figure is thus toward the outlet end of the auger.

FIG. 6 is a view similar to FIG. 2, but to a larger scale and with the idler pulleys removed, the parts broken away, to show more clearly the internal assembly and the clutch construction. Again, the left side is toward the outlet end of the auger.

FIG. 7 is a view oriented like FIG. 1 but showing a modification of power take-off drive from a separate prime mover.

FIG. 8 is a generally vertical end sectional view taken on line 8—8 of FIG. 7.

FIG. 9 is an overall side view, to reduced scale, illustrating the wheeled framework and engine-leveling arrangement applicable to FIG. 1.

At the outset, it is pointed out that certain of the constructional details of the illustrated form of the invention are no dictated by the basic mechanical principles, but rather by practical requirements such as the desirability of ready assembly and disassembly for shipping purposes; particularly where conveyors or loaders of great overall length are desired. Those skilled in the art will readily appreciate that bolted connections, shaft and tube sleeves and the like could, in principle, be avoided without departing from the spirit of the invention. The desirability, from both the manufacturing and customer standpoints, of designing the drive section for use with any selected lengths of auger flighting and casing tubes as may be required in actual use, or to fill specific orders from a minimum component inventory is a similar consideration, and the illustrated design satisfies these objects without any sacrifice of ultimate strength and rigidity.

Referring first to FIGS. 1 and 2 of the drawing, the invention is shown as applied to a wheeled portable grain auger or conveyor, the wheeled support and details of the inlet and outlet ends being omitted for clarity. The tubular auger casing is shown as comprising separate, coaxial sections 10 and 12, held in aligned relation by a ribbed, outrigged framework consisting of four sets of flat bars 14–16, 18–20, 22–24 and 26–28, each bar extending outwardly at an angle from a sleeve 30 or 34 to which it is welded at one end, and the outer ends of the bars of respective pairs being overlapped and bolted to one another as at 36. As indicated at 38 in FIG. 2, the overlapped outer ends of each pair of bars may be correspondingly crimped or offset to define a more definite relative position of these parts. The inner ends of these bars are welded to the respective sleeves 30, 34 into which the confronting end portions of tube sections 10 and 12 are inserted, for ready assembly and disassembly, as well as for increased strength.

Each sleeve section 30 and 34 is itself formed of two semi-cylindrical sheet metal half sections having terminal flanges as at 44 (FIG. 2) pulled up tightly about the corresponding auger tube end sections by flange bolts 46; and the inner extremities of bars 14, 16, 22 and 24 are preferably welded to one flange of each sleeve half-section. The flanges may be reenforced with separate bolt-strips if desired.

A main drive pulley 48 encircles the mutually confronting tube section extremities, its central web passing through a gap between said extremities in a manner to be described below, with the gap sealed as by an encircling rubber ring 50 (FIG. 2). Bars 14, 18, 22 and 26 may be connected by welding to a square bracing or stiffening plate 52 encircling sleeve section 30 and welded to the circumferences of the sleeve half-sections and to an annular heavier-gauge bearing ring to be detailed below. Bars 16, 20, 24 and 28 may similarly be braced by welded gusset plates such as 54, 56 extending from their outer ends to the half-sections of sleeve 34.

As best shown in the top view of FIG. 2, the drive belt 58 passes about substantially a 90 degree section of the peripheral groove of pulley 48, thence about an angled or skewed idler pulley 60 (movable for the clutching function as detailed below) and thence about a second idler pulley 62 secured on a plate 64 welded onto bar 20 and braced as at 66. The belt arrangement thus permits its replacement without any disassembly of other parts, both idlers being cantilevered.

A driving engine 68 is shown as mounted on a cradle 70 in FIG. 1, pivoted at the joint axis 72 between two converging tubular elements 74, 76 having their flattened upper ends bolted to the extremities of bars 18 and 20. A duplicate set of tubular elements depend from the horizontally-opposite bars (26, 28 of FIG. 2) and support the other end of the pivot axis of the cradle. A control rod 78 connects the cradle to a point on a wishbone frame element 80 of the conveyor, for automatic leveling of the engine cradle as the inclination of the auger is altered. An inclination control winch 82 is shown, its cable 84 passing over a pulley carried at the joint of bars 14 and 16. The operation of these parts for automatic engine leveling will be described below in connection with FIG. 9.

Tube sections 10 and 12 form in effect a single auger casing, and in use the auger flight therein could be a single long flight. For ready demountability, however, the flight is formed of two connected sections as detailed in FIGS. 3 to 5 to which reference is now made.

In FIGS. 3 and 4, pulley 48 is shown as having the usual V-grooved rim and a central web plate 86 formed as an equilateral triangle whose truncated corners are welded to the inside of the rim. The sides of this triangle plate are braced against the rim by welded gussets 90, and adjacent each of its corners the plate carries a roller 92 on an anti-friction bearing bolted to the plate at 94 (FIG. 5). These bearing rollers have radial bearing contact about tube section 10, or rather about sleeve 30; specifically, and preferably, about a heavier-gauge bearing ring or collar 96 welded to plate 52 and forming a continuation of sleeve 30; see FIG. 6. Web plate 86 does not lie in the central plane of the pulley rim, but is offset as best shown in FIGS. 5 and 6, to pass into the gap between the confronting extremities of tube sections 10, 12 and sleeves 30, 34.

However, the web plate does not extend inwardly beyond the tube or sleeve walls at this point; as shown best in FIGS. 5 and 6, it is apertured as at 98 so as to be flush with the inner walls of the tube sections except where the single "spoke" or sector 100 of about a 45 degree angular width connects the pulley (rim and web plate) to a shaft section 102. This spoke sector has its inward part at 101 twisted out of the plane of web plate 86 to conform to the helical angulation of the auger flighting 109 and to lie close to it on the side opposite the wearing surface, for minimum impedance to the flow of material being conveyed, and the inner end 101 of the spoke is welded to the shaft section 102.

Coupling sleeves 104 and 106 are bolted to shaft section 102 and to the respective shaft sections 108 and 110 which pass through tube sections 10 and 12. The auger flight 109 could be one continuous piece, but for easy assembly it also is divided into sections whose ends may overlap as at 112 in FIGS. 3 and 5. The flighting is welded at intervals to sleeves 104, 106 and shafts 108 and 110.

FIG. 6 clearly shows the way in which pulley web aperture 98 aligns with the clear aperture of the auger casing tubes. The extremity of tube section 12 extends very close to web plate 86, and is surrounded by rubber sealing ring 50 held between plate 86 and a flange 114 welded about the extremity of sleeve 34.

FIG. 6 also details the control for movable idler pulley 60 of FIG. 2; both idlers being removed in FIG. 6 for clarity. Pulley 60 is normally carried on an angle plate 116 welded to a square-section collar 118 slidable on square bar 120 welded at its inner end to gusset bar 56. A pivot pin 122 fixed to collar 118 mounts the cranked control lever 124 also pivoted at 125 to a link 126 in turn pivoted on pin 128 affixed to an adjustable square-section collar 130 on bar 120. A machine screw 132 threaded through a boss on collar 130 allows it to be adjustably secured in proper position for a given belt length, or varied for belt stretch due to ageing.

Since the belt tension tends to urge collar 118 towards collar 130, the over-center relation of pivot 125 between pivots 122 and 128 locks the idler in its extended (belt-engaged or driving) position when control lever 124 is in its solid-line position; in that position, the lever 124 has its elbow abutted against an end edge of collar 130 to define its clockwise limited position, where it is held by the belt tension; all as shown in full lines in FIG. 6.

To declutch the belt from driving engagement with main drive pulley 48, lever 124 is swung counter-clockwise towards its dash-line position. Pin 125 swings to the right beyond its dead-center position, and continued rotation of the lever causes pin 122 (and hence collar 118) to be moved downwards, allowing idler pulley 60 to move with it and slacking off the belt. This clutch function is thus obtained by very simple additions to the idler pulley mounting.

A very important feature of the novel center-drive arrangement involves the very narrow exposed internal edge 98 of web plate 86. In prior designs of this general type, a substantial axial length of a tube section or sleeve was caused to rotate with the pulley (or drive gear), and centrifugal force acting on the grain or other conveyed material caused it to hang up on this rotating surface. This effect seriously impaired the efficiency of the auger, reducing material flow or necessitating excessive driving power, or both. In the present design, the axial "length" which rotates is only the thickness of web plate 86, a thickness of ¼ inch being adequate for a 14 inch diameter steel pulley. The use of a narrow "spoke" 100, especially one twisted to parallel the helix of the auger flight, and lying closely behind the "idle" surface of the flight, also contributes to the reduction of flow impedance. However, two or more narrow spokes could of course be employed within the broad teaching, especially with reference to the use of a minimum axial length of rotating surface in contact with the flowing material. The pulley design of FIG. 3, with rollers 92 mounted on the pulley web, is a preferred construction for various reasons, but it is apparent that the rollers could alternatively be secured to the stationary framework, as upon transverse plate 52, and bear upon an internal annular surface of the pulley. Such a variation would not conflict with the major aims of the design in its other aspects.

The movable idler pulley 60 must have a substantial travel in order to provide for clutching and declutching not only with a new belt but also with the belt when it has been stretched by usage. Also, to prevent the belt from running off of any of the pulleys, it is necessary that the belt should approach each pulley in a direction lying substantially in the center plane of the pulley groove; its direction where it leaves the pulley may deviate from that plane by a substantial amount without harm.

These requirements are satisfied by the arrangement shown best in FIG. 2, in which the plane of movable idler 60 is tilted so that the belt leaving this idler is always directed to main pulley 48 precisely in the central groove plane of the latter, regardless of the position of this movable idler along support 120. That is, support 120 is parallel to the central plane of pulley 48, and pulley 60 is so mounted above 120 as to maintain the condition stated. The tilt of the plane of movable idler 60 does result in a slight variation in the angle of approach (to the central plane of that pulley) of the belt arriving from fixed idler 62 as pulley 60 travels along support 120, but these pulleys are so angled that the variation is within a tolerable limit to either side of the geometrically perfect arrangement.

The position and angulation of fixed idler 62 is such as to make its central plane intersect the "slack" edge of an average diameter engine pulley, see FIG. 1; thus keeping the belt arriving at the fixed idler in proper position. Finally, the engine itself is preferably mounted so that the belt returning from main auger pulley 48 is always aligned with the central plane of the engine pulley.

The positioning and angulation of the idler pulleys thus allows the necessary driving geometry to be satisfied for practical ranges of belt lengths and engine pulleys, and for the clutching movement of pulley 60, without doing violence to the requirements for a compact, rugged and mechanically simple construction.

The fact that the invention places the main auger drive pulley 48 at a coaxial position intermediate the ends of the auger itself enables the conveyor to be conveniently powered from a wholly external prime mover, such as a known power-take-off connection from a farm vehicle or the like. Such a modification is illustrated in FIGS. 7 and 8 of the drawings, the engine supports 74, 76, the cradle 70 and control rod 78 having been eliminated. In their place, certain parts now to be described have been substituted, and in practice these parts will be supplied as a kit for application to the main frame of the conveyor, which will have been punched or drilled to accept them with a minimum of difficulty on the part of the user.

The added parts include a rugged support bar 144 arranged to be bolted to the depending frame element 24 (see FIG. 8) and carrying at its lower end the stub journal 146 which receives a stub shaft 148 secured to a large pulley 150. The part of shaft 148 which extends through the pulley hub is provided with a universal joint such as a Cardan joint 152 that serves to connect the pulley and shaft for drive by the power take-off shaft 154. A brace 156 connects the lower end of support bar 144 to the under side of the frame element 28. An auxiliary idler pulley 158 is mounted by a suitable bracket bolted to the underside of frame element 20 to carry the belt 58 in its return path from pulley 150 to the main auger pulley 48. As best seen in FIG. 7, the pulleys 150 and 158 are so dimensioned and located that the belt still satisfies the condition stated earlier, to the effect that the belt shall approach each pulley along a line lying in the central plane of the pulley's groove. The power take-off shaft is preferably provided with another universal joint at its distal end, so the appropriate driving connection may be made to any desired prime mover shaft in a manner well known in the power transmission field.

It has already been stated that the conveyor is preferably supported by a wheeled framework and is adjustable thereon to vary the elevation angle of the auger housing 10, 12. A typical support of this kind is illustrated in FIG. 9 of the drawings, the upper portion of housing 10 being slidably supported on a saddle 134 pivoted between the upper ends of radius rods or support bars 136 (only one being visible in this side view) in turn pivoted to the axle of the ground wheels 138. The wishbone support rods 80 (see also FIG. 1) are also pivoted to the wheel axle at their lower ends, and the inclination of the conveyor is controlled by the winch cable 84 which is connected to saddle 134 by a sliding yoke arrangement 141. This construction is shown and described in more detail in the copending application of Martin Mayrath, Serial No. 93,603, filed March 6, 1961.

In order to provide an automatic arrangement for maintaining the drive engine approximately upright regardless of changes in the elevation angle of the conveyor as a whole, the very simple arrangement of FIGS. 1 and 9 is utilized. Cradle 70 is suspended from the supports 74, 76 (as already described) on the pivot axis 72 which is at or near the axis of the engine pulley of commercial engines of appropriate size and power, so that as the cradle swings to maintain the engine upright, the belt path length will not be significantly altered.

A sleeve 140 is secured as by welding to one of the vertical parts of the cradle, and loosely receives an end of the control rod 78 pivoted on a bracket 142 secured to one of the wishbone rods 80. It will readily be seen that changes in the elevation angle of the auger under control of cable 84 will also cause the vertical angle of rod 80 to vary, and hence vary the angle between rod 80 and control rod 78. As the latter angle increases (for example as the conveyor is raised higher), the cradle must rotate counterclockwise about pivot axis 72, in an amount sufficient to keep the engine substantially upright even though supports 74, 76 are being tilted in the clockwise direction. The best position of bracket 142 along rod 80 can readily be calculated for given dimensions of the other parts, or can more easily be approximated by trial, since it depends to some extend upon the length selected for the lower auger housing 12.

Those skilled in the art will recognize that the solution of the problem of providing an auger drive arrangement with an intermediate main drive pulley (that is, between the conveyor ends) which is concentric with the auger housing and yet does not interfere with the clear passage of material along the housing, lends itself to a variety of modifications which properly fall within the scope of the main concept of the invention. Thus, for example, while the invention in the specific form described herein may utilize a thrust bearing at either or both ends of the auger shaft, the function of such thrust bearings may be readily incorporated in the center-driven pulley mounting itself. This may be done by providing a plurality of additional bearing rollers carried by the framework on axes which are radial to the auger shaft, and arranged to bear upon one or both surfaces of the pulley web or plate 86 as seen in FIG. 3. Alternatively, the rollers 92 of FIG. 3 could be mounted upon axes which are canted towards the auger shaft axis rather than parallel to it; these rollers cooperating with a conical bearing ring substituted for the cylindrical ring 96 of FIG. 6. Various modifications of this nature, and others, will occur to those skilled in the art, and it is therefore not intended to limit the invention to the precise details given herein by way of example, except so far as may be required by the scope of the appended claims.

What is claimed is:

1. An auger conveyor comprising a pair of cylindrical auger tube sections, an outrigged framework connecting said sections with respective ends thereof in spaced, juxtaposed, confronting and axially aligned relationship, an auger drive pulley journalled about one of said ends and having a relatively thin web plate presenting a substantially clear central aperture of axial width conforming to the thickness of said web plate and conforming to the inside diameter of said sections, said web plate substantially filling the space between said sections; an auger flight passing through said tube sections and through said central aperture, and relatively narrow spoke means, constituted by an integral continuation of said web plate, connecting said web plate and said auger flight.

2. An auger conveyor in accordance with claim 1, in which said spoke means is a single radial spoke of limited angular width.

3. An auger conveyor in accordance with claim 2, in which said spoke is twisted to conform substantially to the helical surface of said auger flight.

4. In a center drive auger conveyor, a pair of auger tubes having respective ends in mutually confronting relation to define a narrow axial gap therebetween, an auger flight passing through said tubes and across said gap, an auger drive pulley journalled outside of said tubes and having a relatively thin web plate lying in said gap and shaped to form a continuation of the inner surfaces thereof; said web plate having an integral spoke-like portion extending inward toward the common axis of said tubes and forming a driving connection between said web plate and the auger flight in said tubes, the inner end of said spoke-like portion being connected to said flight.

5. A conveyor in accordance with claim 4, in which said web plate comprises a triangular plate having truncated corners secured to the rim of said pulley.

6. A conveyor in accordance with claim 5, and gusset plates connecting the sides of said triangular web plate to the rim of said pulley.

7. An auger conveyor comprising a pair of cylinder auger tube sections, an outrigged frame connecting said sections in alignment with their adjacent ends closely spaced one from another to define a gap, an auger drive pulley journalled about one of said ends, means to drive said pulley, a web plate rigidly secured to the pulley and positioned in the gap between the ends of said sections, said web plate comprising a central aperture conforming to the inside diameter of said sections, and an integral spoke-like portion extending inward toward the common axis of said tubes, an auger and an auger shaft passing through each of said tube sections, a shaft section passing through the aperture of said web plate for connecting said auger shafts, and means connecting said spoke-like portion to said shaft section.

References Cited by the Examiner
UNITED STATES PATENTS

| | | | |
|---|---|---|---|
| 1,032,850 | 7/12 | Mount | 198—213 |
| 1,359,394 | 11/20 | Leaver | 74—228 |
| 2,610,727 | 9/52 | Beldin | 198—213 |
| 2,746,592 | 5/56 | Wilcoxen | 198—213 |
| 2,878,634 | 3/59 | Hemness | 74—221 |

SAMUEL F. COLEMAN, *Primary Examiner.*

WILLIAM B. LA BORDE, *Examiner.*